United States Patent [19]

Schmid

[11] 4,412,557

[45] Nov. 1, 1983

[54] VALVE APPARATUS FOR FLUID CONVEYING SYSTEM

[75] Inventor: Rolyn A. Schmid, Hayward, Wis.

[73] Assignee: Bender Machine Works, Inc., Hayward, Wis.

[21] Appl. No.: 324,838

[22] Filed: Nov. 25, 1981

[51] Int. Cl.$^3$ ............................................. F16K 31/02
[52] U.S. Cl. ............................... 137/624.13; 251/75; 251/77; 251/129
[58] Field of Search ...................... 137/624.13, 624.15; 251/75, 77, 129

[56] References Cited

U.S. PATENT DOCUMENTS

| | | | |
|---|---|---|---|
| 2,483,322 | 9/1949 | Miller | 251/77 X |
| 2,596,409 | 5/1952 | Johnson | 251/77 |
| 2,827,923 | 3/1958 | Sadler | 251/77 X |
| 3,119,399 | 1/1964 | Bender | 134/56 R |
| 3,191,576 | 6/1965 | Bender | 134/168 R |
| 3,342,451 | 9/1967 | Matonsek | 251/77 |
| 3,670,744 | 6/1972 | Bender | 137/561 R |
| 3,732,891 | 5/1973 | Bender | 137/609 |
| 3,802,447 | 4/1974 | Bender | 134/168 R |

Primary Examiner—Alan Cohan
Attorney, Agent, or Firm—James E. Nilles

[57] ABSTRACT

A fluid conveying system includes a fluid conveying conduit which is under vacuum and which has an air opening for admission of air from the atmosphere. Apparatus is provided for periodically admitting air through the opening into the conduit and includes a valve assembly, a solenoid having a movable armature for actuating the valve assembly, and an adjustable timer for controlling energization of the solenoid. The valve assembly includes a stopper plug connected to a rod and seatable against the air opening and held there by vacuum, a bushing member connected to and movable by the solenoid armature, and a compression spring connected between the bushing member and plug rod. In operation, energization of the solenoid causes armature movement which initially effects compression of the spring and application of a loading force on the plug. Subsequent armature movement effect opening movement of the plug and allows the pre-loaded opening force to further assist in rapid opening movement of the plug.

4 Claims, 6 Drawing Figures

VALVE APPARATUS FOR FLUID CONVEYING SYSTEM

BACKGROUND OF THE INVENTION

1. Field of Use

This invention relates generally to valve apparatus for use in fluid conveying systems. In particular, it relates to valve apparatus which periodically effects rapid opening of a valve to admit air into a vacuumized fluid line in the fluid conveying system.

2. Description of the Prior Art

The dairy industry employs fluid conveying systems wherein milk is conveyed by pipeline from the milking parlor to the milk storage area. Such systems include fluid washing apparatus for the pipelines. Such cleaning-in-place apparatus is shown and described in the U.S. Pat. Nos. 3,119,399 issued Jan. 28, 1964 entitled Apparatus for Washing Milk Conducting Lines by Lloyd F. Bender and 3,191,576 issued June 29, 1965 entitled Milk Line Releaser and Washer Apparatus issued to Lloyd F. Bender. These patents relate to apparatus for automatically moving fluid under a constant and continuous vacuum and even during the periodic fluid dumping operation. They provide apparatus for cleaning a pipeline for milk and the like by subjecting the interior of the link to a succession of relatively short cleansing slugs separated by air-filled spaces and by advancing a series of spaced liquid slugs with a scouring action through the milk line at a rapid rate. Patent 3,119,399 utilized a timer, shown in FIGS. 7, 8 and 9 for periodically connecting the interior of the pipeline with the ambient air of the atmosphere to alternately cut off the air admission and allow the milk line to receive successive liquid slugs from a tank of cleaning solution. This patent used a rotary valve type device but that device had the limitation in that the orifice used to emit air opened and closed slowly as the rotor passed the orifice and for large diameter milk conducting lines that device was not entirely successful. Patent 3,191,576 also used an electrically actuated timer and rotary valve for intermittently admitting successive slugs of cleaning solution separated by atmospheric airfilled spaces and this timer was also of the type shown in the said U.S. Pat. No. 3,119,399.

Other prior art devices relating generally to this type of equipment utilized an electrical solenoid to pull a stopper plug out of an orifice in a fluid line to emit the air. Such devices are shown in the U.S. Pat. Nos. 3,802,447 issued Apr. 9, 1974 for Automatic Tank Washer with Spin-Burst Mechanism for Washing, Rinsing, and Sanitizing of Lloyd F. Bender; 3,670,744 issued June 20, 1972 for Solenoid Operated, Two Way Diverter Valve for Fluid Line Washing Apparatus of Lloyd F. Bender; and 3,732,891 issued May, 15, 1973 for Solenoid Operated, Two Way Diverter Valve for Fluid Line Washing Apparatus of Lloyd F. Bender. The pulling force of the vacuum in the fluid line and against which the solenoid must act to operate or move the stopper plug is very great. Accordingly, it is desirable to provide improved valve apparatus for such systems.

SUMMARY OF THE PRESENT INVENTION

The present invention provides improved valve apparatus for a fluid conveying conduit which is under a vacuum and which provides the fast opening and closing action of the prior art solenoid operated type of valves but also relies on preloading forces to effect fast opening.

More specifically, the present invention provides improved valve apparatus for periodically admitting air into a fluid conveying conduit which is under vacuum and wherein an opening is provided in the conduit to define a valve seat against which a shiftable stopper plug in the valve apparatus is movable between a closed position that prevents the entry of air into the conduit and an open position that permits the entry of air into the conduit to thereby automatically provide alternating slugs of air and cleaning solution in the line for complete scouring thereof. More specifically, the valve apparatus provides a driving connection between the stopper plug and the timing/driving means therefore which acts to first apply a preloading force on the plug in the opening direction and then subsequently applies a direct force to break the vacuum seal. After the vacuum seal has been broken, the preloading force stored in a spring in the driving connection acts to quickly shift the plug away from the opening with a rapid action to permit the free entry of air into the conduit. The connection also insures a fast closing of the plug against the opening at the appropriately timed interval.

A more specific aspect of the invention relates to apparatus of this type which includes a valve assembly, a solenoid having a movable armature for actuating the valve assembly, and an adjustable timer for controlling energization of the solenoid. The valve assembly includes a stopper plug connected to a rod and seatable against the air opening and held there by vacuum, a bushing member connected to and movable by the solenoid armature, and a compression spring connected between the bushing member and plug rod. In operation, energization of the solenoid causes armature movement which initially effects compression of the spring and application of a loading force on the plug. Subsequent armature movement effect opening movement of the plug and allows the pre-loaded opening force to further assist in rapid opening movement of the plug.

These and other objects and advantages of the present invention will appear hereinafter as this disclosure progresses, reference being had to the accompanying drawings.

DESCRIPTION OF A PREFERRED EMBODIMENT

The general organization of cleaning-in-place fluid conducting lines is shown in the said U.S. Pat. Nos.

Figure 1:
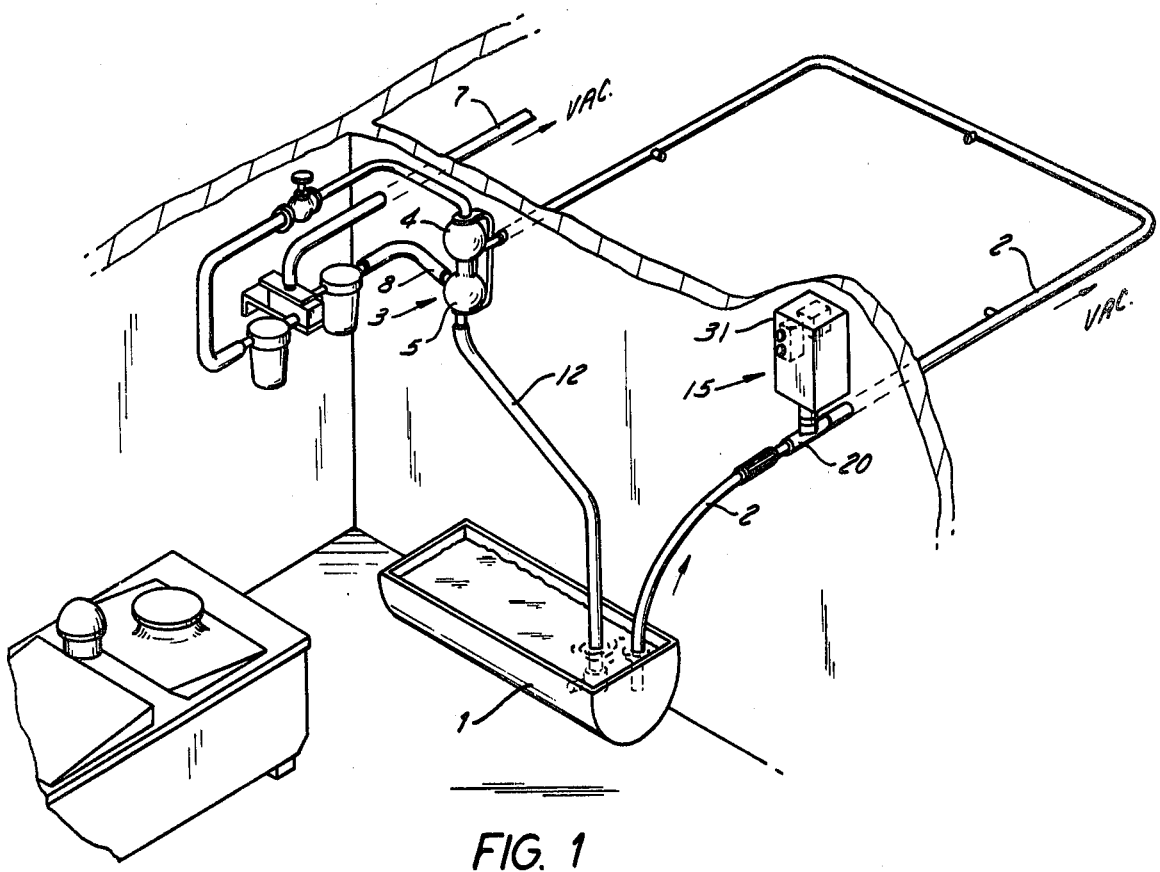
FIG. 1 is a perspective view of a portion of the milk conveying pipeline system in a milking parlor employing valve apparatus in accordance with the present invention.

3,119,399 and 3,191,576. The invention finds particular utility when used in such milk line releaser and washer system and a detailed description of the system is deemed to be neither necessary nor desirable for purposes of the present disclosure. It is, however, believed sufficient to say with reference to FIGS. 1 and 2 that a tank 1 of cleaning solution or water is provided and such is conveyed via conduit line 2 to a releaser 3. This releaser 3 is of the type shown and described in detail in U.S. Pat. No. 3,191,576 and has two separate vessels 4 and 5 connected together by the one-way check valve 6 located therebetween. The upper vessel 4 has a fluid inlet 9 and is subjected to constant vacuum from the conduit 7. In other words, vessel 4 is always subjected to vacuum, either directly through conduit 7 from the vacuum source (not shown) or from the lower vessel 5 which is alternately subjected to vacuum or atmosphere via conduit 8. Periodically the fluid collected in vessel 5 is dumped to a storage tank 1 via pivoted disc valve 11 located at the discharge end of the conduit 12 extending from vessel 5. Patent 3,191,576 describes this operation in detail and also includes the rotary type valve previously referred to and over which the present invention is an improvement for the aforementioned reasons.

During the cleaning operation for in-place cleaning of the entire fluid conveying system, the interior of the system is subjected alternatively to slugs of cleaning fluid from tank 1 in which slugs of air are conveyed to thoroughly clean the system with a scouring action as described in said prior art patents. The present invention provides an improved valve apparatus 15 which is simple and quick acting in operation and which does not require excessive force on a stopper plug 22 therein at repeated and frequent intervals in order to break the vacuum seal in the conduit line 2.

In accordance with the present invention, a section of the conduit 2 has provided a T-shaped housing 20 therein in which an opening 21 forming a valve seat, is located in the T-shaped housing. A frusto-conical shaped stopper plug 22 is abuttable against the seat 21, forming a valve assemblage therewith, and is shiftable between a closed position against the seat (FIGS. 2 and 5) to prevent entry of air into the conduit 2, and is also shiftable to an open position away from the seat to permit the entry of air into the conduit (FIG. 6).

Figure 2:
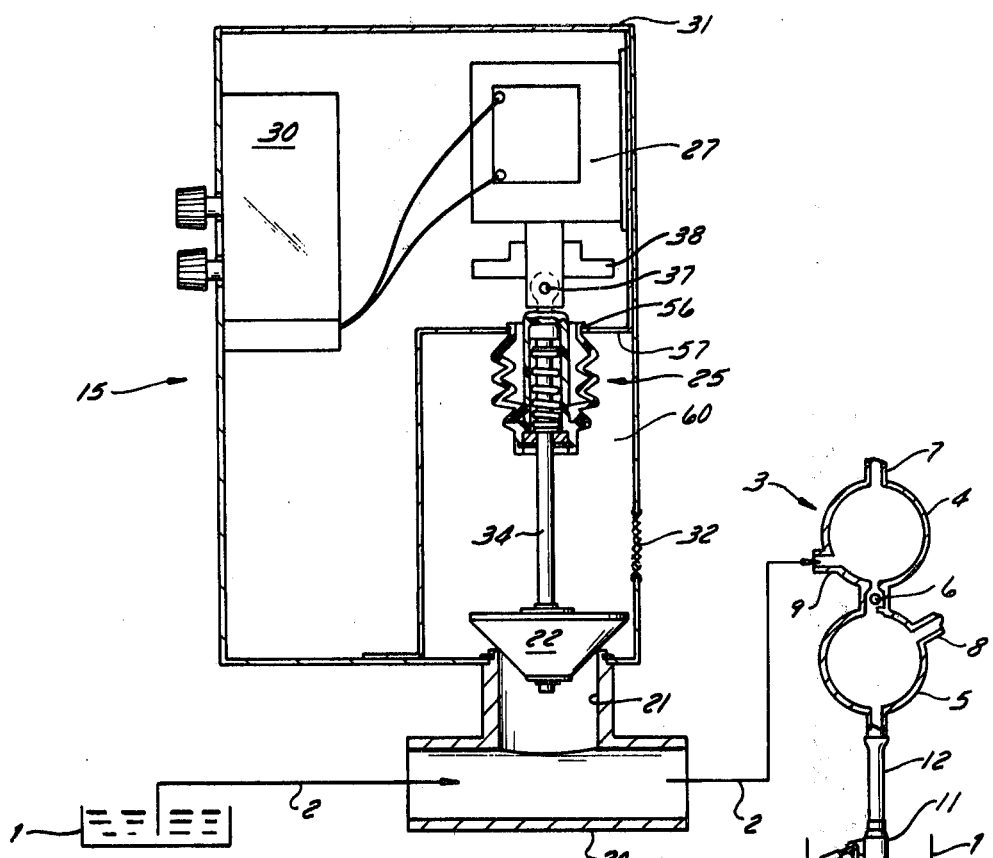
FIG. 2 is an enlarged view, partly in cross-section, of the valve apparatus of FIG. 1 and showing the valve assembly in closed position.

As FIG. 2 shows, the valve apparatus 15 for periodically connecting the interior of a vacuumized pipeline 2 to the atmosphere through opening 21 in the pipeline comprises a valve assembly 25 cooperating with the opening 21, an electrically powered solenoid 27 or drive means for actuating the valve assembly 25, and an electric timer 30 for controlling the energization and de-energization of the solenoid 27 so as to effect cyclical operation of the valve assembly 25. The components 25, 27 and 30 are mounted in a housing 31 which is mounted on T-shaped connector 20 of pipeline 2. Housing 31 has a screened air access opening 32 therein.

Figure 4:
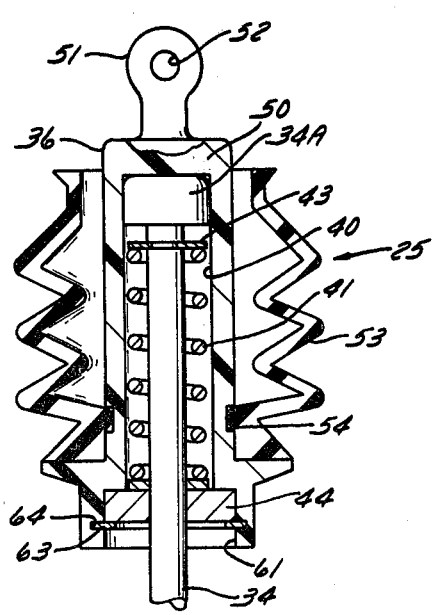
FIG. 4 is an enlarged cross-section view of a portion of the valve assembly shown in FIG. 2.

As FIGS. 2 and 4 show, the valve assembly 25 comprises the stopper plug 22 seatable in the orifice 21, a shaft member 34 having its lower end connected to the stopper plug 22, a bushing member 36 having its upper end connected by a pin 37 to the solenoid armature 38 and having a bore 40 therein in which the upper end of the shaft 34 is slidably received, and a compression spring 41 disposed around the shaft 34 within the bore 40 and entrapped between a projection or snap ring 43 on the end of shaft 34 and an axial stop 44 on the lower end of the bushing member 36.

More specifically, bushing member 36, which is fabricated of plastic, takes the form of a hollow cylindrical member into which bore 40 extends from the bottom end and which is closed by an upper wall 50 to which an attachment fitting 51 is integrally formed. Fitting 51 includes a hole 52 for accommodating solenoid attachment pin 37. Bushing member 36 is provided with a compressible bellows 53 which is secured between the lower exterior of the bushing member, as by engaging groove 54, and the edge of a hole 56 in an upper plate 57 inside housing 31. As FIG. 2 shows, opening 21 communicates through a chamber 60 in housing 31 to screened opening 32 and bellows 53 serves as a protective seal against contaminants falling into hole 21 when the valve is open. The axial stop 44 at the lower end of bushing member 36 takes the form of a washer which is disposed in an enlarged opening or recess 61 communicating with bore 40. The washer is held in place by a conventional snap ring 63 which engages an annular groove 64 in recess 61.

As FIG. 2 shows, when the plug 22 is seated and the solenoid 27 is de-energized, the armature 38 is fully extended and the rubber cushion 34A bears against the upper end wall 50 of the bore 40 of the bushing member 36.

Figure 5:
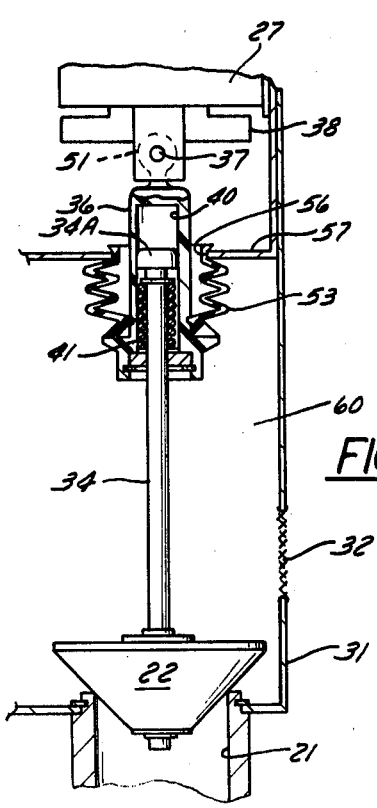
FIG. 5 is a view of the valve assembly showing it in another condition just prior to reaching open position.
Figure 6:
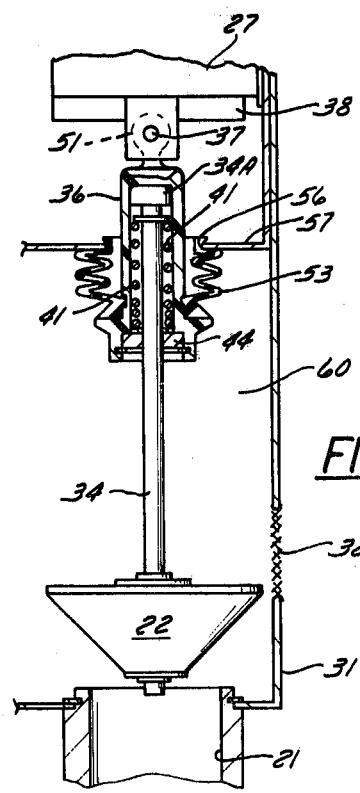
FIG. 6 is a view of the valve assembly showing it in open position.

As FIG. 5 shows, when the solenoid 27 is energized, the armature 38 begins to be retracted and the bushing member 36 is raised causing the spring 41 to become fully compressed against the projection 43 at the top end of the shaft 34.

As FIG. 6 shows, when the armature 38 is fully retracted, it raises the shaft 34 and the plug 22 and the stored energy in the spring 41 acts to further raise the shaft and the plug to open position with a snap action.

After the holding vacuum force on the plug 22 has been blocked, the spring 41 immediately acts with a snap action to withdraw the plug from the opening 21 thereby permitting quick and complete entry of air into the conduit 2 and the consequent emission of a slug of air therein.

When the solenoid is again de-energized, the armature 38 descends thereby allowing the plug 22 to reseat itself in the orifice 21 under the force of gravity.

The above process is automatically repeated throughout the washing cycle. In this manner the interior of the conduit 2 is periodically connected with the ambient atmosphere to permit alternating slugs of liquid and air through the system for cleaning purposes.

Figure 3:
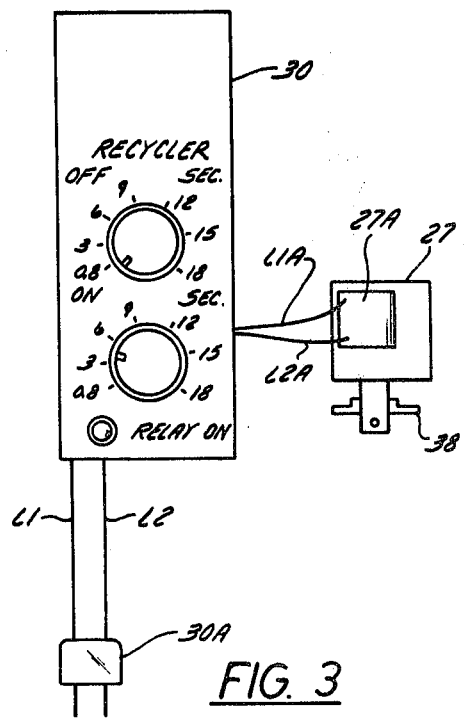
FIG. 3 is a schematic view of the solenoid and timer of the valve apparatus shown in FIGS. 1 and 2.

As FIG. 3 makes clear, timer 30 which is connected to energize the operating coil 27A of solenoid 27 by conductor wires L1A, and L2A, is itself connectable by conductor wires L1 and L2 and plug 30A to a suitable source of electric power such as a 120 volt AC 60 Hz power supply. In an actual embodiment of the invention timer 30 took the form of an automatic asymmetrical timer or recycler having control knobs 30C and 30D for adjusting the on cycle and off cycle, respectively, and between 0.8 seconds and 18 seconds as the system requires. The timer was an "Electromatic-S-System-SC185120 RECYCLER" available from the ELECTROMATIC Company, Denmark and rated at supply: 120 VAC 45–65 Hz 2 W having contacts rated at 10 AMP-300 VAC Max HO and 0.2 AMP-250 Vdc max.

The solenoid actually used was rated at 120 V 60 Hz ½ amp and is available from the Singer Control Company of America. The solenoid exerted a force capable of overcoming 15 inches of vacuum in line 2.

I claim:

1. A valve apparatus for use in a fluid conveying system and including:
   - a housing including a plate defining a lower chamber in said housing, said plate having an aperture therethrough;
   - a fluid conveying conduit connected to said housing which is capable of being under vacuum and having an opening communicating with said lower chamber and from thence to atmosphere, said opening having a valve seat therearound;
   - a stopper plug located in said lower chamber above said opening and movable between a closed position wherein it engages said valve seat and is held thereagainst by vacuum in said conduit to prevent air entry into said conduit and an open position above said valve seat to permit air entry into said conduit through said opening from said lower chamber;
   - timed drive means including a solenoid mounted in fixed position on said housing above said plate and having a stationary coil and a vertically movable armature;
   - a hollow bushing pivotally connected to and movable with said armature and extending downwardly through said aperture in said plate, said bushing including a bore closed at its upper end and open at its lower end;
   - a stop member on said bushing near said lower end of said bore;
   - a connecting rod having a lower end connected to said plug and having its upper end extending into the open end of said bore in said hollow bushing;
   - a projection on said connecting rod near said upper end thereof;
   - a cushion disposed in said bore between the closed end thereof and said upper end of said connecting rod;
   - a compression type biasing spring in said bore and disposed around said rod between said stop member on said bushing and said projection on said connecting rod;
   - a flexible boot connected to said bushing and to said plate around said aperture in said plate to prevent contaminants from entering said lower chamber;
   - said solenoid coil when energized initially operating to effect upward vertical movement of said armature and of said bushing relative to said connecting rod thereby effecting compression of said spring, said solenoid coil effecting subsequent further upward vertical movement of said armature to effect movement of said plug away from said valve seat as said bushing, the compressed spring and said connecting rod are moved upwardly together by said armature, whereupon said spring decompresses and moves said connecting rod upwardly within said bushing and moves said plug rapidly upward away from said valve seat, said solenoid coil when de-energized allowing said armature, said bushing, said connecting rod and said plug to descend under the force of gravity so that said plug re-engages said valve seat.

2. Valve apparatus according to claim 1 wherein said bore includes an enlarged recess defining a shoulder and an annular groove in the wall of said recess;
   - wherein said stop member on said bushing comprises a washer disposed in said enlarged recess;
   - and including a snap ring engageable with said groove to retain said washer against said shoulder.

3. Valve apparatus according to claim 1 or 2 wherein said projection on said connecting rod comprises a snap ring.

4. Valve apparatus according to claim 3 wherein said flexible boot engages an annular groove on the exterior of said bushing.

* * * * *